(12) United States Patent
Tibbits

(10) Patent No.: US 6,616,338 B2
(45) Date of Patent: Sep. 9, 2003

(54) EXTENDED LOAD ZONE BEARING

(75) Inventor: Patrick Tibbits, Valparaiso, IN (US)

(73) Assignee: Emerson Power Transmission Manufacturing, L.P., Maysville, KY (US)

( * ) Notice: Subject to any disclaimer, the term of this patent is extended or adjusted under 35 U.S.C. 154(b) by 0 days.

(21) Appl. No.: 09/880,428

(22) Filed: Jun. 13, 2001

(65) Prior Publication Data

US 2003/0021504 A1 Jan. 30, 2003

(51) Int. Cl.⁷ ............................................. F16C 33/58
(52) U.S. Cl. .................................. 384/513; 384/447
(58) Field of Search .......................... 384/447, 513, 384/515, 516, 449, 58, 543, 546, 547, 549, 586, 587, 588, 490, 450

(56) References Cited

U.S. PATENT DOCUMENTS

| | | | |
|---|---|---|---|
| 3,321,256 A | | 5/1967 | Orain |
| 4,067,626 A | | 1/1978 | McElwain |
| 4,909,641 A | | 3/1990 | Mc Kenzie |
| 5,221,146 A | * | 6/1993 | Maruyama ................. 384/447 |
| 5,286,117 A | * | 2/1994 | Wojan et al. ............... 384/513 |

FOREIGN PATENT DOCUMENTS

| | | | |
|---|---|---|---|
| FR | 1507257 | * 12/1967 | .............. 384/535 |
| GB | 2203501 | * 4/1988 | .............. 384/490 |

* cited by examiner

Primary Examiner—Thomas R. Hannon
(74) Attorney, Agent, or Firm—McDonnell Boehnen Hulbert & Berghoff

(57) ABSTRACT

A bearing for providing the ability to more optimally and evenly share the load among a set of rolling elements to reduce maximum roller load in a cost effective and efficient manner, is provided. The bearing may include an outer race and an inner race, where the inner race includes a first and a second outer radius. The first outer radius of the inner race is radially spaced from the outer race, and the second outer radius forms an eccentric section. Rolling elements are positioned between the inner and outer races, where a portion of the bearing load is transferred to adjacent rolling elements located at the eccentric section.

30 Claims, 4 Drawing Sheets

EXTENDED LOAD ZONE BEARING

FIELD OF THE INVENTION

This present invention relates to bearings in general, and in particular to a bearing assembly including rolling elements.

BACKGROUND OF THE INVENTION

A bearing is generally a device used to reduce friction between moving surfaces and to support moving loads. One common type of bearing is a rolling element bearing that typically includes an outer ring, inner ring, and rolling elements. The outer ring is larger in diameter than the inner ring such that a number of rolling elements, in the form of solid balls or rollers, are placed at equal intervals in the open space between the two rings. The rolling elements often rotate between an inner and outer race that include a ball or roller path positioned within the inner and outer ring, respectively. More specifically, the inner race includes the ball or roller path positioned within the inner ring at the outside diameter. The outer race includes the ball or roller path positioned within the outer ring at the inner diameter. The rolling elements may include small steel balls, cylindrical, or conical rollers, depending on the particular application. The rolling elements assist in distributing and reducing friction through the movement of the bearing.

A rolling element bearing that utilizes rolling elements in the form of balls is often referred to as a ball bearing. In the ball bearing, a number of balls rotate freely around the inner ring positioned between the inner race and an outer race. The inner ring is often rigidly fixed to a rotating shaft, and the outer ring can be unsupported or conversely rigidly fixed to a support. The balls are generally held in position between the inner and outer races by a cage or separator that serves to keep them evenly spaced and to prevent them from contacting each other. A rolling element bearing that utilizes rolling elements in the form of rollers is similar to the ball bearing, except that in place of the balls are generally steel cylinders or rollers.

Typically, rolling element bearings attempt to transfer or balance a load between the inner and outer races. This transfer of load may occur utilizing only a portion of the rolling elements, especially those rolling elements in closest proximity to the radial location of the load, or the radial load zone. This uneven, or concentrated load distribution can cause the central rolling element, the element in the closest proximity to the radial location of the load, or rolling elements nearest the central rolling element, to carry most, if not all, of the load. This can undesirably limit the life of the bearing and the maximum load it can carry by centralizing the load on only a few of the rolling elements.

Although rolling element bearings undergo uneven and sometimes concentrated load distribution, certain types of bearings are more susceptible to a reduced life or reduced load capacity than other types of rolling element bearings. For example, a well known rolling element bearing referred to as a cam follower bearing, with an unsupported outer ring, tends to concentrate the load on the central rolling element more heavily than do other types of bearings. However, spreading the load, which is distributing a portion of the load through rolling elements adjacent to those moving through the radial load zone, can assist in reducing the maximum load received by each rolling element, in particular the central rolling element. Theoretically, an increased radial load zone might extend bearing life and consequently increase the maximum load support capability for a rolling element bearing including the cam follower type.

Some have attempted to implement this theoretical technique of increasing the radial load zone to extend bearing life or increase the maximum load support capability by forming an elliptical inner race. One arrangement for spreading the load in a bearing, in which the load is applied in an established direction defining a predetermined radial zone, is provided in U.S. Pat. No. 3,321,256 to Orain. Orain discloses a bearing with an inner race having a substantially elliptical cross section. The bearing attempts to attain a higher load capacity by more evenly distributing load over the rollers in the load zone. Orain mentions approximation of an elliptical profile by locally increasing the radius of curvature of the inner race by eccentric machining. However, Orain limits such approximate elliptical profiles to those which do not prejudice the continuity of the surface of the inner race, and sectors of differing curvature are made to smoothly merge. Machining smooth transitions between race sectors of differing curvature adds greatly to the manufacturing complexity and cost of the bearing.

Another arrangement for spreading the load in a bearing, in which the load is applied in an established direction defining a predetermined radial loading zone, is provided in U.S. Pat. No. 4,067,626 to McElwain. McElwain discloses a universal bearing joint that utilizes a bearing cup having an inner race formed in the shape of an ellipse. The lesser diameter of the elliptical surface is generally disposed 90° from the maximum loading point to attempt to distribute the load over many needle bearing elements. Although the elliptical surface assists in increasing the life of the bearing, the elliptical surface requires extensive and elaborate manufacturing processes, and does not provide a sufficient distribution of the load.

In yet another arrangement, U.S. Pat. No. 4,909,641 to McKenzie discloses a bearing with an expanded load zone by utilizing an inner race supported by an elastically deformable body. The bearing includes a non-rotating ring which has an elastomer of non-uniform thickness bonded to it. The non-uniform thickness of the elastomer causes the inner race to go out of round and deform when under load, attempting to reduce maximum rolling element stress. However, manufacturing this type of bearing also requires extensive and elaborate manufacturing processes, and the elastomer does not provide sufficient strength or durability to provide an ideal solution.

While the above non-circular inner races tend to more evenly share loads among the rollers in the radial load zone of the bearing, each requires elaborate manufacturing processes to produce an elliptical race, some even require introduction of an elastically deformable body and are otherwise deficient in providing an optimum load distribution. Often, these elaborate manufacturing processes and materials undesirably increase the cost of the bearing to a consumer. Using these less durable, and less than optimal load distribution techniques, a consumer may then undesirably choose larger bearings to handle the heavier loads, which may result in larger and more expensive than necessary bearings, and further result in failed bearings more often.

Thus, there is a need for a bearing that can more optimally and evenly share the load among a set of rolling elements in the bearing load zone to reduce maximum roller load on any one rolling element.

SUMMARY OF THE INVENTION

The present embodiments provide the ability to more optimally and evenly share a load among a set of rolling elements to reduce maximum roller load in a cost effective and efficient manner. The present embodiments are illustrated as exemplary embodiments that disclose a system and method for reducing the maximum load on the central rolling element in such bearings.

In an aspect of the present embodiment, a bearing generally includes an annular outer race and an inner race, where the inner race includes a constant first outer radius and a second outer radius in a given plane perpendicular to the axis of rotation of the bearing. In an exemplary embodiment, the second outer radius forms an eccentric section that is positioned under the bearing load. Also included in this exemplary embodiment, are rolling elements positioned between the inner and outer races, where the bearing load on the set of the rolling elements located at the eccentric section is distributed to adjacent rolling elements.

In another aspect of the present embodiment, an inner ring has an inner race generally including a first outer radius and an eccentric section having a second outer radius that is larger than the first outer radius wherein the second outer radius provides the eccentric section extending past the limits of the bearing load zone, and wherein the eccentric section has a center of curvature offset with respect to the center of curvature of the first outer radius.

The present embodiments provide the ability to more evenly and optimally share the load among a set of rolling elements to reduce maximum roller load in a bearing in a cost effective and efficient manner. The present embodiments utilize a circular inner race over much of the outer surface, but includes an eccentric section having a slightly greater radius of curvature, and having a center of curvature offset with respect to the center of curvature of the outer surface of the remainder of the inner race. Utilizing the present embodiments, the load is more evenly and optimally shared among the rolling elements in the bearing load zone which reduces the maximum roller load, and increases fatigue life of the bearing. Such a bearing or bearing assembly does not require the introduction of an elastically deformable body or an elliptical inner race, and does not require expensive machining of smooth transitions between race sections of differing curvature.

The foregoing and other objects, features and advantages of the bearing or bearing assembly will be apparent from the following more particular description of preferred embodiments as illustrated in the accompanying drawings.

DETAILED DESCRIPTION OF PREFERRED EMBODIMENTS

The present embodiments are illustrated as exemplary embodiments that disclose a system and method for reducing the maximum load on the central rolling element in such bearings, and distributing the load more evenly and optimally over the radial load zone. The exemplary embodiments have been implemented in a bearing that utilizes rolling elements such as balls or rollers. More specifically, the exemplary embodiments have been implemented on a cam follower bearing. It should be understood that the present embodiments may be utilized on other types of bearings including ball bearings, and tapered, cylindrical, spherical roller bearings where a more evenly distributed load is desired. Furthermore, by an analogous modification of the outer race surface, the present embodiments may be utilized on bearings in which the inner ring rotates.

Figure 1:
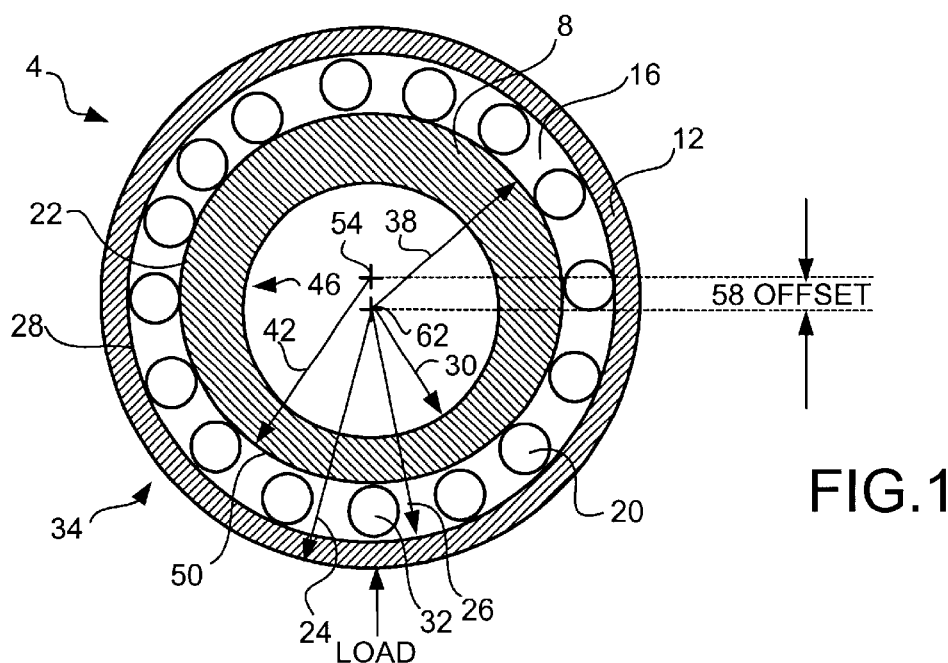
FIG. 1 is a sectional view of an exemplary bearing having an inner race with an eccentric section.

FIG. 1 is a sectional view of an exemplary cam follower bearing 4, generally having inner ring 8 and outer ring 12, illustrated in a loaded state. The sectional view shown is parallel to a plane perpendicular to the axis of rotation of the cam follower bearing 4. The outer ring 12 is larger in diameter than the inner ring 8 such that a space 16, in which the rolling elements are located, occurs between the inner and outer rings 8 and 12. Sixteen rolling elements 20, with or without a separator (not shown for clarity), are located in space 16 between the inner and outer rings 8 and 12. Of course, more or fewer rolling elements 20 may be utilized depending on the bearing, application, and geometry used. Preferably, the rolling elements 20 rotate on an inner race 22 and outer race 28 that include a ball or roller path positioned on the inner and outer ring 8 and 12, respectively. In particular, the inner ring 8 includes the ball or roller path positioned within the inner race 22. The outer ring 12 includes the ball or roller path positioned within the outer race 28. Eccentric section 50 is shown on the inner race 22 of the inner ring 8 having a second radius 42 offset from the remainder of the first radius 38 by an amount 58.

The outer ring 12 has an outer radius 24 and inner radius 26, and is preferably radially spaced from the first radius 38 of the inner ring 8. The outer ring 12 has a cylindrical shape, but can have other configurations so that the bearing 4 can ride on different types of tracks or perform different types of functions. Other configurations can include flanged, v-groove, and u-groove shapes. Selection of the configuration depends on the application, such as is known in the art. Additionally, the outer ring 12 may have an optionally crowned outer surface 34 to compensate for small amounts of misalignment between the crowned outer surface 34 and the track or cam (not shown).

The inner ring 8 has an inner radius 30 and first and second outer radii 38 and 42, respectively. Preferably, the second radius 42 is larger in magnitude than the first radius 38 in any given plane perpendicular to the axis of rotation of bearing 4, and is centered with an offset 58 from the first radius 38 such that an eccentric section 50 is formed on the surface of the inner race 22. The eccentric section 50 on the inner race 22 surface preferably has a greater radius of curvature, and has a center of curvature 54 offset 58 with respect to the center of curvature 62 of the first radius 38. It should be understood that the inner ring 8 is not limited to having a circular inner surface 46, but can also utilize any other geometrical shaped surface such as triangular or square, depending on the bearing and shaft application. Furthermore, the inner ring 8 might also have a solid center such that a shaft is integral to the inner ring 8.

A number of solid balls or rollers, collectively referred to as rolling elements 20, are placed at equal intervals in space 16. Preferably, a cage or separator (not shown) placed in space 16 can be used to maintain the equal intervals between the rolling elements 20. The cage may be constructed using a variety of different materials such as steel, brass, or nylon, and may be pressed, machined, and molded. The rolling elements 20 can be formed as standard geometric shapes, such as is known in the art including balls, cylindrical rollers, needle rollers, tapered rollers, or spherical rollers depending on the bearing application.

Preferably, the load is directed through the eccentric section 50 of the bearing 4. Therefore, the load is desirably transferred through adjacent rolling elements 20 located at the eccentric section 50 from the inner to outer ring 8 and 12, or likewise from the outer to inner ring 12 and 8, respectively depending on the application. The eccentric section 50 provides for the ability to more evenly share the load among a set of rolling elements 20 to reduce maximum roller load at the central rolling element 32, improve bearing fatigue life, and increase the maximum load capability for the bearing 4.

Figure 2:
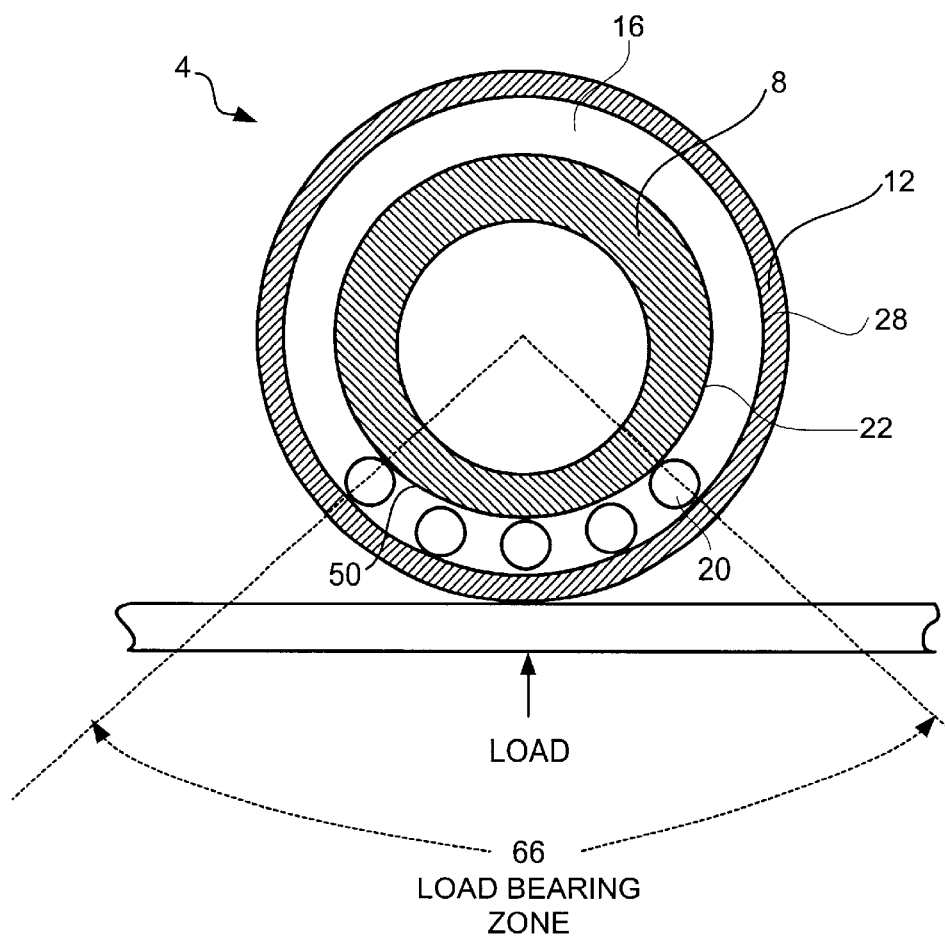
FIG. 2 is a sectional view illustrating the load bearing zone of the bearing of FIG. 1.

FIG. 2 is another sectional view of the exemplary loaded cam follower bearing 4 of FIG. 1 having an eccentric section 50. Similar to FIG. 1, the sectional view shown is parallel to a plane perpendicular to the axis of rotation of the cam follower bearing 4. The cam follower bearing 4 is shown supporting a radial load, however, the present embodiments may be utilized in a bearing supporting other types of loads including a combination of both radial and thrust loads. When the bearing is supporting the radial load, the load is distributed through a portion of the bearing 4, referred to as the radial load zone or bearing load zone 66 via the eccentric section 50. Each point or surface where the load is supported by the races 22 and 28 are referred to as load carrying contact points. These contact points can include the inner and outer races 22 and 28, respectively, and rolling elements 20 (only those rolling elements 20 in the bearing load zone 66 are shown for simplicity).

Figure 3:
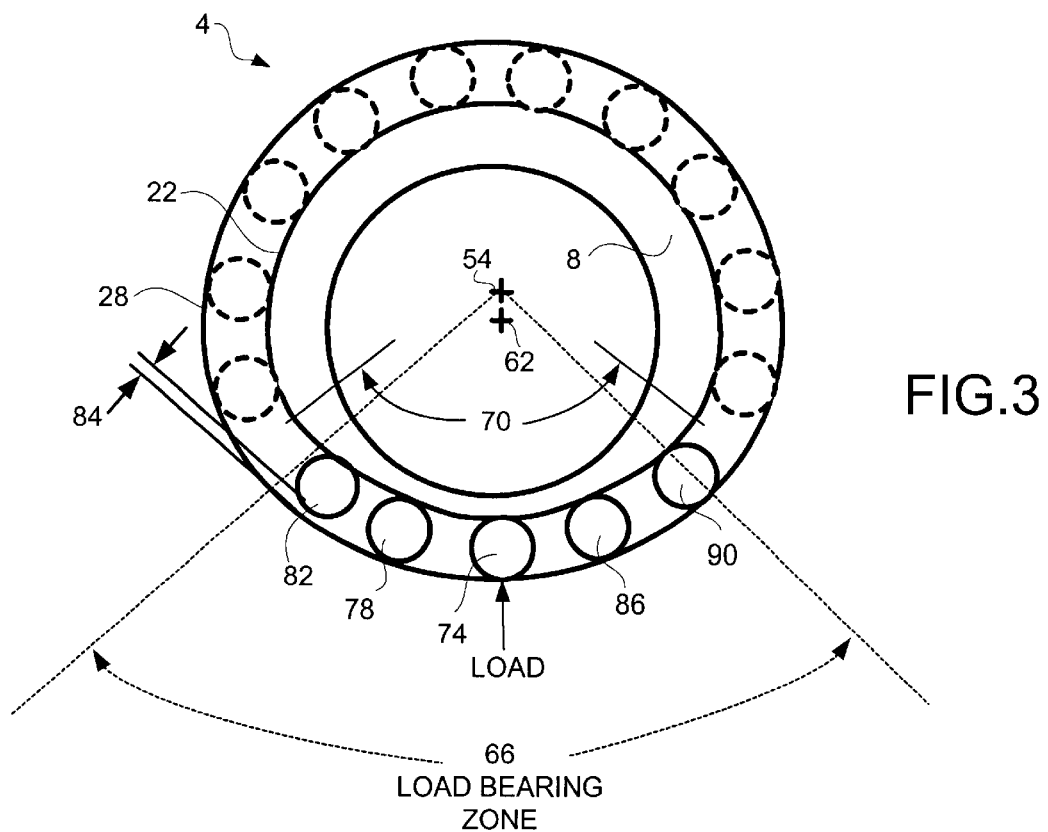
FIG. 3 is another sectional view of the bearing in FIG. 1 that illustrates an exaggerated loaded condition.

FIG. 3 is yet another sectional view of the loaded cam follower bearing 4 of FIG. 1 that illustratively exaggerates the eccentric section 50 of the inner ring 8 for clarity of illustration. As described above with reference to FIG. 1, the inner ring 8 preferably has one inner radius 30 and two outer radii, namely first and second radii 38 and 42, respectively. The second radius 42 is preferably larger in magnitude than the first radius 38 in a given plane perpendicular to the axis of rotation of bearing 4, and the second radius 42 is centered such that the eccentric section 50 can be formed. Preferably, the eccentric section 50 is extended until the outer edges 70 are past the edges of the load bearing zone 66. Thus, the center of curvature 54 for the eccentric section 50 lies offset from, or eccentric to, the center of curvature 62 for the remainder of the outer diameter of the inner race 22.

By orienting the eccentric section 50 to lie in the bearing load zone 66, the diametral clearance 84, or the distance between the rolling elements and outer race 28 is desirably decreased when the bearing 4 is loaded. In particular, as the bearing 4 is in a loaded state, the outer ring 12 preferably deforms such that the diametral clearance 84, especially near the outer edges 70, is decreased.

Therefore, because of the decreased diametral clearance 84, especially near the outer edges 70, the rolling elements 20 can carry a larger portion of the bearing load, while the central rolling element 74 at the center of the load bearing zone 66 carriers a reduced load. Thus, the bearing load is more evenly distributed among adjacent rolling elements 78, 82, 86, and 90. The more evenly distributed the load is over the rolling elements 74, 78, 82, 86, and 90, the load at the central rolling element 74 is reduced, thus increasing the fatigue life of the bearing 4. The outer edges 70 of the eccentric section 50 are shown just outside of the bearing load zone 66. The outer edges 70 of the eccentric section 50 might also be placed inside, equal to, or outside of the bearing load zone 66 depending on the particular bearing application.

Figure 4:
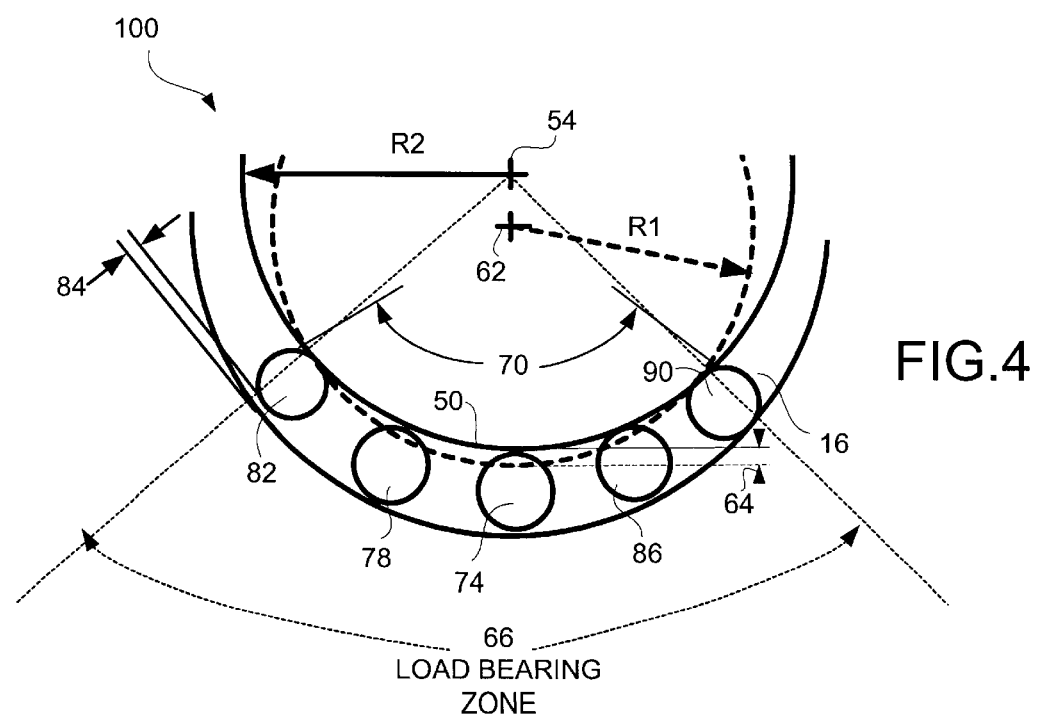
FIG. 4 is a sectional, partial view of an exemplary bearing constructed having an eccentric section.

FIG. 4 is a sectional, partial view of an exemplary bearing 100 constructed having an eccentric section 50. This view shows, in a more detailed way, the first radius 38 ($R_1$) and second radius 42 ($R_2$), respectively of the inner ring 8, and how the first and second radii 38 and 42 form an eccentric section 50. The values of the first radius 38 and the second radius 42, and the eccentricity between the centers of curvature 62 and 54, respectively, can assist in determining the relief at the center of the load zone, referred to herein as relief 64. Because the second radius 42 is larger than the first radius 38 and offset, an eccentric section 50 having edges 70 can be formed. The eccentric section 50 provides a section that allows rolling elements 74, 78, 82, 86, and 90 to more evenly share the load to reduce maximum roller load at the central rolling element 74 to improve bearing 100 fatigue life and increase the maximum load capability.

To provide for an illustration of the exemplary embodiment, assume the first radius 38 or $R_1$=0.29135 inches and the desired relief 64 or r=0.0035 inches. Solving for the nonlinear relation determines the fractional increase in curvature f, which determines the value of the increased radius 42, $R_2$=(1+f)$R_1$. Preferably, the section of increased radius extends slightly beyond the load zone angle 70. In the following nonlinear relation angle a, denotes an angle more than one half the load zone angle 70.

$$f = (1+f)\cos\left(\arcsin\left(\frac{\sin(a)}{(1+f)}\right)\right) - \cos(a) - \frac{r}{R_1}$$

For this exemplary embodiment, the second radius 42, or $R_2$=0.029309 inches. The following relation then determines the eccentricity or offset 58.

$$e = r + fR_1$$

For this embodiment, the eccentricity 58, i.e., the offset, e=0.00209 inches.

For any value typical of bearing of first radius 38, or $R_1$, load zone angle 70, and any desired relief 64, r, the above relationships determine the second radius 42, or $R_2$, and the eccentricity 58, e, which will form a section of increased radius extending slightly past the limits of the load zone. It should be understood that the values used in the above described embodiment may differ according to particular bearing types and applications.

Referring again to FIG. 4, the eccentric section 50 can be formed from a rolling element bearing by performing an extra finish grind on the inner race 22 to produce a region having a larger radius of curvature than the bearing had before the extra finish grind occurred. The center of curvature 54 of the flatter region lies offset from, or eccentric to, the center of curvature 62 of the remainder of the inner race 22. By orienting this flatter region or eccentric section 50 under the load direction, the diametral clearance 84 is decreased at the rollers 82 and 90 near the edge of the load zone such that the rolling elements 78, 82, 86, and 90 carry a larger share of the load, while the central rolling element 74 carriers a smaller than usual load. The more uniform load sharing over the rolling elements 78, 74, 82, 86, and 90 desirably decreases the maximum roller load and increases the bearing life. Other methods can be used to produce an eccentric section 50.

Figure 5:
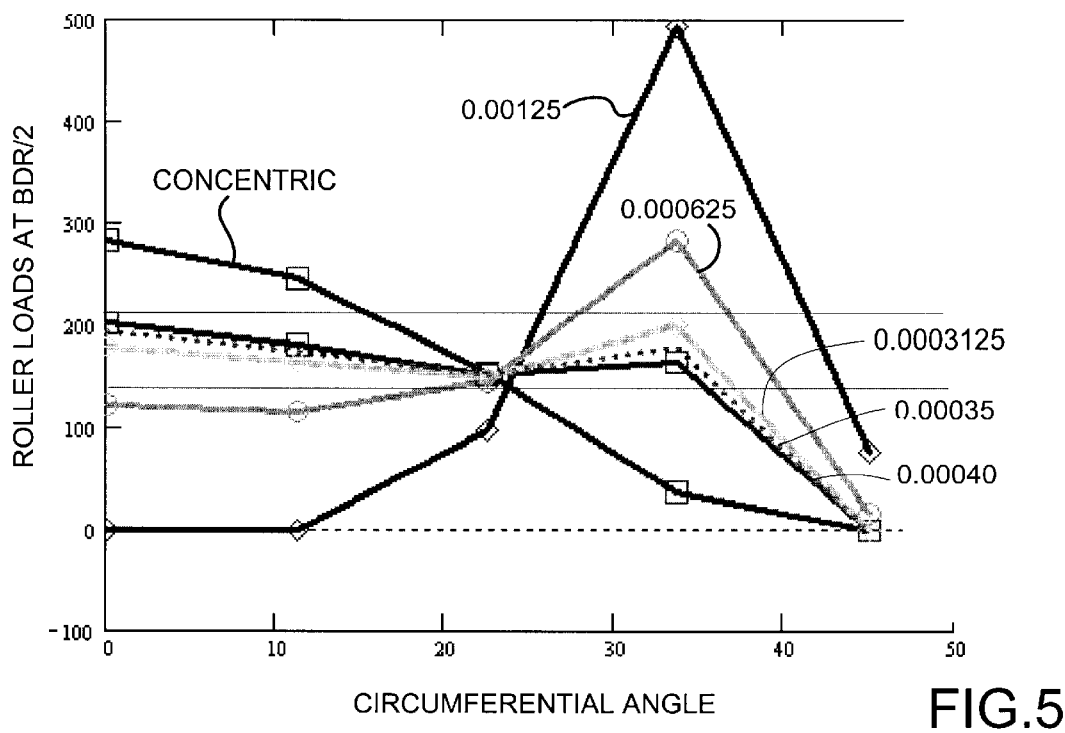
FIG. 5 is a plot illustrating roller load versus circumferential angle for CFH-1-S type cam follower bearings with a variety of different relief values.
Figure 6:
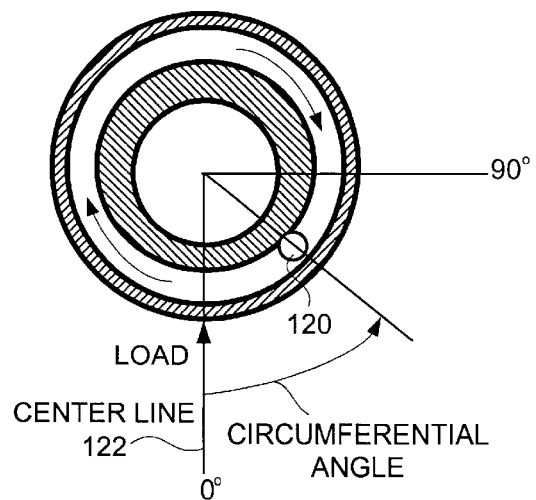
FIG. 6 is a sectional view of the bearing of FIG. 5 further defining circumferential angle.

FIG. 5 is a plot illustrating roller load versus circumferential angle for a CFH-1-S cam follower bearing with a variety of different relief values. Referring first to FIG. 6, the circumferential angle used in the plot of FIG. 5 is defined and illustrated. In this exemplary embodiment, the circumferential angle is defined as the angle of the center point of a rolling element 120 as it passes through the bearing load zone. In this described exemplary embodiment, rolling element 120 is rotating around the inner ring 8 in the clockwise direction. 10 Consequently, rolling element 120, as shown in the figure, has a circumferential angle of 45° with respect to the center line 122 of the bearing load zone 66. The rolling element 120, if put in motion, would eventually have a circumferential angle of 0° where the rolling element 120 would be located at the center of the bearing load zone 66. If the rolling element 120 continued to rotate in the clockwise direction from 0°, it would eventually rotate out of the bearing load zone.

Referring back to FIG. 5, a finite element analysis model, utilizing commercially available ANSYS software, of a CFH-1-S cam follower bearing predicted the roller loads for several values of relief at the center of the bearing load zone. The plot shows that, under a radial load of half of the basic dynamic rating ("BDR"), values of relief between 0.0003 inches and 0.0004 inches produce the most uniform sharing and distribution of the load and the lowest maximum roller loads.

Eight CFH-1 cam follower bearings were modified to include an eccentric section 50, referred to as modified cam follower bearings, by grinding the eccentric section 50 of the inner race 22. The eight modified cam follower bearings had values of relief ranging from 0.0003 inches to 0.00045 inches, which were chosen from the plot shown in FIG. 5. The eight modified cam followers and eight CFH-1 unmodified cam followers (i.e., cam follower bearings not having an eccentric section) underwent testing on a bearing fatigue life test machine. Each test applied a load of one-half the basic dynamic rating to each bearing of a pair of modified or unmodified cam follower bearings. Four pairs of modified and four pairs of unmodified were loaded. The test setup included a thermocouple mounted magnetically against the end of each cam follower stud. The test terminated for a pair of cam follower bearings when either of the thermocouples indicated a temperature above 200-degrees Fahrenheit. For example, if one of the two cam follower bearings failed, it was designated a failure, and the other cam follower bearing was suspended from the test.

Figure 7:
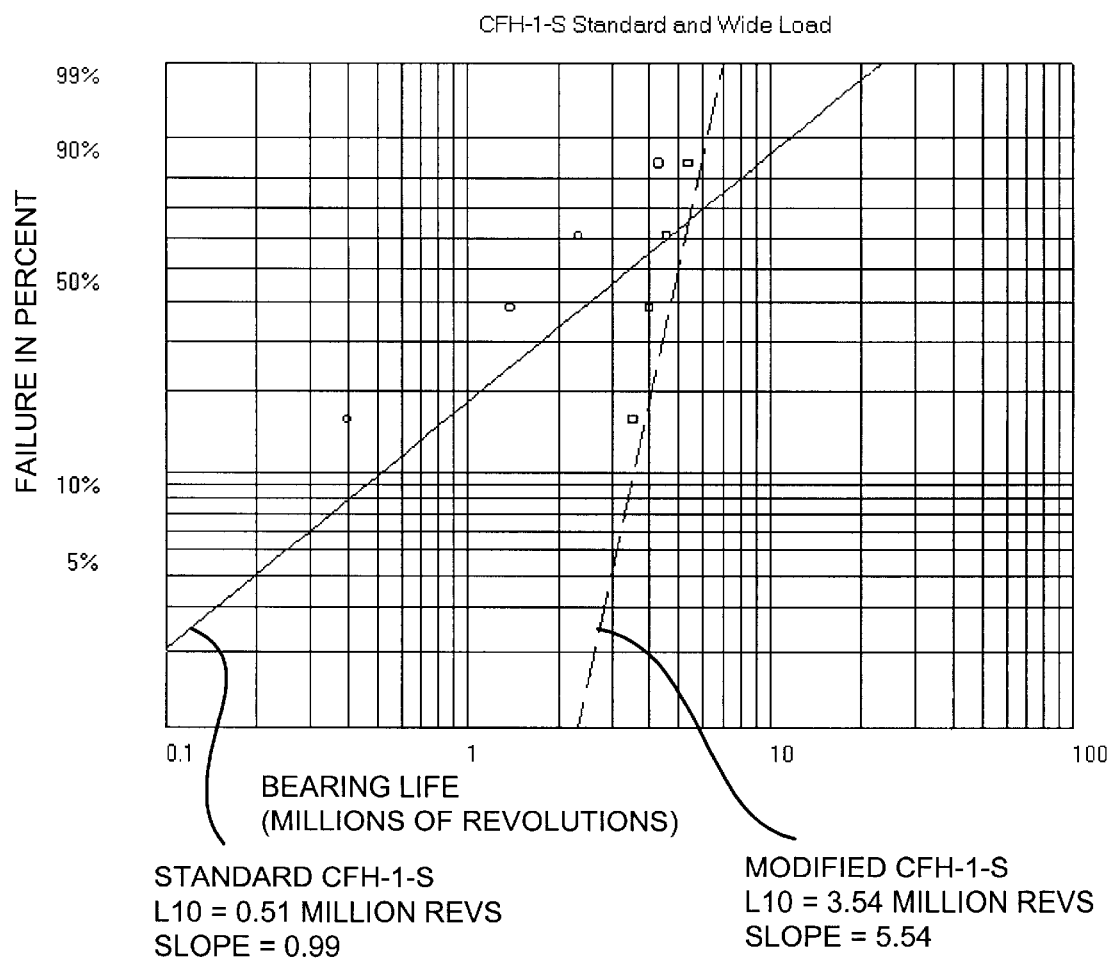
FIG. 7 is a Weibull plot illustrating the improved fatigue life for the bearing of FIG. 5 compared to a standard bearing not having an eccentric section.

FIG. 7 is a Weibull plot illustrating the improved fatigue life for the modified cam follower bearings of FIG. 5 compared to a standard bearing or unmodified cam follower bearing not having an eccentric section. Weibull distributions, as known in the art, can be plotted to predict bearing failure rates and are used frequently in bearing reliability analysis. The Weibull plot of FIG. 7 is a logarithmic plot with the y-axis designating bearing failure in percent and the x-axis designating revolutions in the millions. The plot illustrates that the modified cam follower bearings utilizing values of relief ranging from 0.0003 inches to 0.00045 inches have an L10 life (i.e., fatigue life) of about 3.5 million revolutions, while the unmodified cam follower bearings have an L10 life of about 0.5 million revolutions. Consideration of the confidence intervals of the two Weibull distributions on the plot in FIG. 7 predicts with 93% probability that the modified cam follower bearing with an eccentric section has an improved L10 life over the unmodified cam follower bearings.

The present embodiments, described herein as exemplary embodiments, provide the ability to more evenly share the load among a set of rolling elements to reduce maximum roller load in a cost effective and efficient manner. The present embodiments utilize a circular inner race over much of the circumference of the bearing, but includes an eccentric section having a slightly greater radius of curvature, and having a center of curvature offset with respect to the center of curvature of the remainder on the inner race. Utilizing the present embodiments, the load is more evenly shared among the rolling elements in the bearing load zone which reduces the maximum roller load, and increases fatigue life of the bearing. Such a bearing or bearing assembly does not require the introduction of an elastically deformable body or expensive machining to produce an elliptical or continuously curved race.

It should be understood that the processes, methods and systems described herein are not related or limited to any particular type bearing, unless indicated otherwise. Various types of general purpose or specialized bearings may be used in accordance with the teachings described herein.

In view of the wide variety of embodiments to which the principles of the present embodiments can be applied, it should be understood that the illustrated embodiments are exemplary only, and should not be taken as limiting the scope of the present invention. For example, more or fewer elements may be used in the diagrams.

The claims should not be read as limited to the described order or elements unless stated to that effect. Therefore, all embodiments that come within the scope and spirit of the following claims and equivalents thereto are claimed as the invention.

What is claimed is:

1. A bearing, comprising:
   an outer ring having an annular outer race;
   an inner ring having an inner race with a first outer radius and a second outer radius, wherein the first outer radius of the inner race is radially spaced from the outer race, and wherein the second outer radius forms an eccentric section; and
   rolling elements positioned between the inner race and outer race, wherein a portion of a bearing load on a set of the rolling elements at the eccentric section is transferred to adjacent rolling elements.

2. The bearing of claim 1 wherein the second outer radius is greater in magnitude than the first outer radius in a given plane perpendicular to the bearing axis of rotation.

3. The bearing of claim 1 wherein the second outer radius has a center of curvature offset with respect to the first outer radius.

4. The bearing of claim 1 wherein the eccentric section over the bearing load extends past the limits of the bearing load zone.

5. The bearing of claim 1 wherein the bearing load is distributed over the set of rolling elements at the eccentric section.

6. The bearing of claim 1 wherein the rolling elements comprise ball bearings.

7. The bearings of claim 1 wherein the rolling elements comprise roller bearings.

8. The bearing of claim 1 wherein the outer ring is rotatable.

9. The bearing of claim 1 wherein the bearing is a cam follower bearing.

10. The bearing of claim 9 wherein the outer ring is unsupported.

11. The bearing of claim 1 wherein the eccentric section assists in decreasing the diametral clearance at a portion of the set of rotating elements near the edge of the bearing load zone.

12. An inner ring of a bearing, comprising:
an outer surface having a first outer radius and a second outer radius larger than the first outer radius in a given plane perpendicular to a axis of rotation of the bearing; wherein the second outer radius provides an eccentric section extending past the limits of a bearing load zone, and wherein the second outer radius has a center of curvature offset with respect to a center of curvature of the first outer radius.

13. The inner race of claim 12 wherein the eccentric section assists in decreasing the diametral clearance near the edge of the bearing load zone to distribute the bearing load.

14. The inner race of claim 12 wherein the value of the first outer radius and the radial relief at the center of the load zone determine the second outer radius and the eccentricity between the centers of curvature.

15. The inner race of claim 14 wherein the relief at the center of the bearing load zone can comprise a range of values.

16. The inner race of claim 15 wherein the range of values for the relief for a CFH-1-S cam follower is 0.0003 to 0.0004 inches.

17. The inner race of claim 16 wherein the eccentricity is 0.00209 inches.

18. A bearing assembly comprising:
an outer ring having an outer race with an inner radius;
an inner ring having an inner race with a first and second outer radius where the first outer radius intersects the second outer radius at a transition point; and
rolling elements positioned between the inner and outer races;
wherein a portion of a bearing load is transferred from the inner to the outer race through a set of the rolling elements located at the second outer radius of the inner race.

19. The bearing assembly of claim 18 wherein second outer radius of the inner race forms an eccentric section.

20. The bearing assembly of claim 18 wherein the second outer radius of the inner race decreases radial space between the outer and inner race.

21. The bearing assembly of claim 20 wherein the decreased radial space between the outer race and inner race provides for earlier contact between rolling elements traveling over the second outer radius and the bearing load.

22. The bearing assembly of claim 18 wherein the relationship between the first and second outer radii comprises $R_2=(1+f)R_1$ where f is the fractional increase in curvature.

23. The bearing assembly of claim 22 wherein fractional increase in curvature is determined by the following relationship:

$$f = (1+f)\cos\left(\arcsin\left(\frac{\sin(a)}{(1+f)}\right)\right) - \cos(a) - \frac{r}{R_1} \text{ where } a$$

is a relation angle and r is a desired relief.

24. The bearing assembly of claim 22 wherein eccentricity is determined by the following relationship: $e=r+fR_1$.

25. A bearing assembly comprising:
an outer ring having an outer race with an inner radius;
an inner ring having an inner race with a first and a second outer radius; and
rolling elements positioned between the inner and outer races;
wherein a portion of a bearing load is transferred from the inner to the outer race through a set of the rolling elements located at the second outer radius of the inner race; and wherein the second outer radius of the inner race forms an eccentric section.

26. A bearing assembly comprising:
an outer ring having an outer race with an inner radius;
an inner ring having an inner race with a first and a second outer radius; and
rolling elements positioned between the inner and outer races;
wherein a portion of a bearing load is transferred from the inner to the outer race through a set of the rolling elements located at the second outer radius of the inner race; and wherein the second outer radius of the inner race decreases radial space between the outer and inner race.

27. The bearing assembly of claim 26, wherein the decreased radial space between the outer race and inner race provides for earlier contact between rolling elements traveling over the second outer radius and the bearing load.

28. A bearing assembly comprising:
an outer ring having an outer race with an inner radius;
an inner ring having an inner race with a first and a second outer radius; and
rolling elements positioned between the inner and outer races;
wherein a portion of a bearing load is transferred from the inner to the outer race through a set of the rolling elements located at the second outer radius of the inner race; wherein the relationship between the first and second outer radii comprises $R_2=(1+f)R_1$ where f is the fractional increase in curvature.

29. The bearing assembly of claim 28, wherein fractional increase in curvature is determined by the following relationship:

$$f = (1+f)\cos\left(\arcsin\left(\frac{\sin(a)}{(1+f)}\right)\right) - \cos(a) - \frac{r}{R_1} \text{ where } a$$

is a relation angle and r is a desired relief.

30. The bearing assembly of claim 28, wherein eccentricity is determined by the following relationship: $e=r+fR_1$.

* * * * *